United States Patent [19]

Koide

[11] Patent Number: 5,235,030
[45] Date of Patent: Aug. 10, 1993

[54] AROMATIC COPOLYAMIDE FROM NAPHTHALENE DICARBOXYLIC ACIDS

[75] Inventor: Shunichi Koide, Tokyo, Japan

[73] Assignee: Showa Shell Sekiyu Kabushiki Kaisha, Japan

[21] Appl. No.: 870,150

[22] Filed: Apr. 17, 1992

Related U.S. Application Data

[63] Continuation-in-part of Ser. No. 716,934, Jun. 18, 1991, abandoned.

[30] Foreign Application Priority Data

Jun. 20, 1990 [JP] Japan .................................. 2-161528

[51] Int. Cl.$^5$ ............................................. C08G 69/26
[52] U.S. Cl. ................................... 528/344; 528/183; 528/193; 528/229; 528/337; 528/338; 528/339; 528/340
[58] Field of Search ............... 528/344, 337, 338, 339, 528/340, 183, 193, 229

[56] References Cited

U.S. PATENT DOCUMENTS

| | | | |
|---|---|---|---|
| 2,296,555 | 9/1942 | Hubert et al. ......................... | 528/344 |
| 3,674,752 | 7/1972 | Ridgway et al. ...................... | 528/344 |
| 4,012,365 | 3/1977 | Moriyama et al. ................... | 528/344 |
| 4,042,571 | 8/1977 | Kawase et al. . | |
| 4,640,973 | 2/1987 | Davis et al. . | |
| 5,102,982 | 4/1992 | Koide ................................... | 528/344 |

FOREIGN PATENT DOCUMENTS 50-45095 4/1975 Japan .
59-126484 7/1984 Japan .

OTHER PUBLICATIONS

Ridway, James S., Structure-Property Relationships of Ring-Containing Nylon 66 Copolyamides. Journal of Polymer Science: Part A-1, vol. 8 3089-3111 (1970).

*Primary Examiner*—Harold D. Anderson
*Attorney, Agent, or Firm*—Cushman, Darby & Cushman

[57] ABSTRACT

Linear aromatic copolyamides having good processability, superior thermal stability and excellent mechanical properties are provided. They comprise 55-90 mole % of a repearing unit of

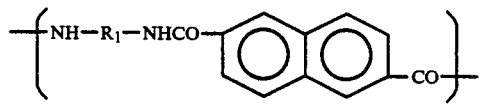

and 45-10 mole % of a repeating unit of

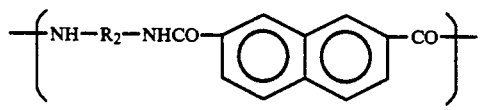

wherein $R_1$ and $R_2$ each is a $C_{4-12}$ aliphatic alkylene.

2 Claims, No Drawings

AROMATIC COPOLYAMIDE FROM NAPHTHALENE DICARBOXYLIC ACIDS

This is a continuation-in-part of U.S. Ser. No. 07/716,934 filed Jun. 18, 1991, now abandoned.

The present invention relates to new linear aromatic copolyamides, and more particularly it relates to melt-moldable linear aromatic copolyamides which have a high glass transition temperature, an excellent thermal resistance and a high elastic modulus and are excellent in molding properties and mechanical strength and a process for producing them.

Aliphatic polyamides such as nylon 6 or nylon 6,6 are used in various applications owing to their easy molding properties, but they are, however, inferior in thermal resistance.

On the other hand, aromatic polyamides obtained from aliphatic diamines such as hexamethylenediamine and aromatic dicarboxylic acids such as terephthalic acid, notwithstanding their excellent thermal resistance, have a defect that they are impossible to be melt-molded.

The object of the present invention is to provide an aromatic copolyamide which is capable of melt-molding and has a superior thermal stability and excellent mechanical properties.

The first feature of the present invention is an aromatic copolyamide which comprises substantially 55-90 mole % of a repeating unit represented by the following formula.

and 45-10 mole % of a repeating unit represented by the following formula:

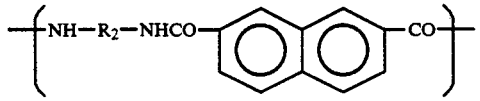

wherein $R_1$ and $R_2$ are groups which are independently selected from a group consisting of aliphatic alkylene groups having 4-12 carbon atoms, and Ar represents a moiety selected from a group consisting of a phenylene group, a naphthylene group and a group represented by the formula:

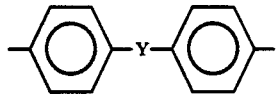

wherein Y is a group which is selected from a group consisting of a 1,4-phenylene group, a 2,6-naphthalene group, a 1.5-naphthalene group, —O—, —S—, —CO—, —SO$_2$— and —O—, —S—, —CO—, —SO$_2$—and a single bond. The preferable Ar is a 2,6-naphthalene group in which the bonding chains extend to the coaxial direction or the parallel direction.

The second feature of the present invention is a process for producing the aromatic copolyamide mentioned above, which comprises allowing an aqueous solution of one or more aliphatic diamines selected from diamines represented by the formulae:

to react with a solution of dicarboxylic acids comprising 55-90 mole % of aromatic dicarboxylic acids or acid chlorides thereof represented by the formula:

wherein $R_1$, $R_2$ and Ar are the same as defined above, and X represents a hydroxyl group or a halogen atom, and 45-10 mole % of 2,7-naphthalene dicarboxylic acid.

The polymerization may be conducted by a conventional melt-polycondensation method, but it is conducted preferably by an interfacial polycondensation which is developed by the present inventors, since the product copolymer obtained by the present method is less colored and has high molecular weight.

The melt-polycondensation technique is conducted by heating an aqueous diamine salt mixture under a gauge pressure of 40-150 lb/in$^2$ to remove water, maintaining said pressure to prepare a low polymer and then releasing the pressure to raise the temperature up to the melting point of the polymer or more.

The interfacial polycondensation is conducted in such a manner that an aqueous solution of diamines and solution of aromatic dicarboxylic acid halides, such as a mixture of 2,6-naphthalene dicarboxylic acid halide and 2,7-naphthalene dicarboxylic acid halide in organic solvents are catalytically reacted in the presence of acid receptors.

As the aqueous medium used for dissolving the diamines, water is usually used. The concentration of the diamines in said aqueous medium, though it is not critical, is generally in the range of 0.01-0.5 mole/l, preferably 0.03-0.2 mole/l.

Moreover, the aqueous phase preferably contains neutralizing agents to catch and neutralize hydrogen chloride which is a by-product of the polycondensation reaction. Such neutralizing agents include hydroxides, carbonates or hydrogen carbonates of alkali metals or alkaline earch metals such as sodium hydroxide, potassium hydroxide, calcium hydroxide, barium hydroxide, sodium carbonate, potassium carbonate, sodium hydrogencarbonate or the like, preferably sodium hydroxide. These neutralizing agents may be contained in the aqueous phase generally in a concentration of 0.05-1 mole/l, preferably 0.1-0.5 mole/l.

Also, as the aromatic dicarboxylic acid halides and the 2,7-naphthalene dicarboxylic acid halide, there may be mentioned chloride, bromide or fluoride. Chloride is preferred. The organic solvents which can be used for dissolving the acid halide components include, for example, halogenated aliphatic hydrocarbons such as dichloromethane, chloroform, 1,2-dichloroethane, sym-tetrachlorethane the like, and aromatic hydrocarbons such as benzene, toluene, anisole, chlorobenzene, acetophenone, benzonitrile, nitrobenzene and the like. Chloroform and toluene are preferred. The concentration of said naphthalene dicarboxylic acid halide in these solvents is not critical, but the total concentration of the aromatic dicarboxylic acid halide and the 2,7-naphthalene dicarboxylic acid halide are preferably in the range of 0.01-0.5 mole/l, particularly 0.03-0.2 mole/l.

Typical examples of $H_2N$—$R_1$—$NH_2$ and $H_2N$—$R_2$—$NH_2$ include 1,6-diaminohexane, 1,7-diaminoheptane, 1,8-diaminooctane, 1,6-diamono-2,5-dimethylhexane, 1,6-diamino-2, 4-dimethylhexane, 1,6-diamino-3,3-dimethylhexane, 1,6-diamino-2,2-dimethylhexane, 1,9-diaminononane, 1,7-diamino-2, 3-dimethylheptane, 1,7-diamino-2,4-dimethyl-heptane, 1,7-diamino-2,5-dimethylheptane, 1,7-diamino-2, 2-dimethylheptane, 1,10-diaminodecane, 1,8-diamino-6-methyloctane, 1,8-diamino-5-methylnonane. 1.8-diamino-2, 4-dimethyloctane, 1,8-diamino-3,4-dimethyloctane, 1,8-diamino-4-methylnonane, 1,8-diamino-2,2-dimethyloctane, 1,6-diamino-3,3-dimethyloctane, 1,8-diamino-4, 4-dimethyloctane, 1,6-diamino-2,4-diethylhexane, 1,11-diaminoundecane, 1,12-diaminododecane or the like. 1,6-Diaminohexane, 1,8-diaminooctane, 1,10-diaminodecane, 1,12-diaminododecane or a mixture of the two or more of them is preferred, particularly 1,6-diaminohexane.

As the moiety Ar in said formula XOC—Ar—COX, there are mentioned a 1,4-phenylene group, a 2,6-naphthylene group, a 1,5-naphthylene group, or groups

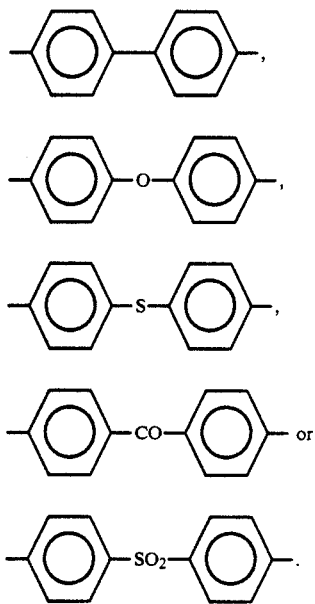

In this connection, a small amount of aromatic diamines or the other aromatic dicarboxylic acid such as naphthalene dicarboxylic acid or isophthalic acid may be co-condensed, unless the object of the present invention is nor impaired.

The present invention is further explained with reference to examples.

Physical properties are measured in accordance with the following methods.

Viscosity η inh

A polymer sample (0.1 g) is dissolved in 20 ml of sulfuric acid (0.5 g/dl), and a 10 ml portion of the solution is filled in an Ostwald viscometer, which is placed in a constant temperature bath at 30° C. for measuring the time of falling a ball (t). The measurement is performed with only a solvent in the similar manner (t₀). The inherent viscosity is calculated from the following equation:

$$\eta\,inh = \ln(t/t_0)/0.5$$

Note: Viscosity is measured with a viscometer which gives as a measure of the time $T_0$ ca. 120 seconds.

Glass transition temperature ($T_g$) and melting point ($T_m$)

These temperatures are measured with a differential scanning calorimeter (DSC-Model 20, manufactured by SEIKO DENSHI KOGYO). About 10 mg of a polymer obtained is weighed precisely on an aluminium pan, and the temperature is programmed from 50° C. to 400° C. at a rate of 10° C./min in a nitrogen gas stream. The peak at the first inflection point is regarded as the glass transition temperature $T_g$), and the endothermic peak is regarded as the melting point ($T_m$).

Decomposition temperature

Measurement is conducted with a differential thermal and thermogravimetric analyzer ($T_g$/DTA-Model 20, manufactured by SEIKO DENSHI KOGYO). About 10 mg of a polymer obtained is weighed precisely on a platinum pan. The temperature is programmed from 50° C. to 400° C. at a rate of 10° C./min in an air stream, and a temperature at which 10% of the weight of the polymer has been decreased is regarded as the decomposition temperature of it.

Tensile strength, elongation and tensile modulus

Measurements are conducted with RTM-25rtm (manufactured by TOYO BOLDWIN CO.) in accordance with ASTM-D822-83. A film is cut into a size of 120 mm in length and 100 mm in width. The both ends with a distance of 10 mm of the test piece are fixed with and bonded to papers, and thickness is measured at five points to calculate the average of the five thicknesses as the thickness. The test piece is gripped with tester jaws, of which the distance is set to 100 mm. The load-elongation curve is recorded on applying a load 10 kg at a tensile rate of 50 mm/min to calculate the tensile strength and the elongation from the following equation:

Tensile strength (kgf/mm²)=Akgf/sectional area mm²,

Elongation (%) =100(L mm−100 mm)/100 mm.

A: Maximum load in the curve above.

L: Maximum length in the curve above.

A film is cut into a size of 270 mm in length and 10 mm in width. The both ends with a distance of 10 mm of the test piece are fixed with and bonded to papers, and thickness is measured at five points to calculate the average of the five thicknesses as the thickness The test piece is gripped with tester jaws, of which the distance is set to 250 mm. The load-elongation curve is recorded on applying a load 10 kg at a tensile rate of 25 mm/min to calculate the tensile modulus:

Tensile modulus (kgf/mm²)=Bkgf.250/sectional area mm².

B: Load necessary to elongate.

EXAMPLE 1

A 0.1 mole aqueous sodium hydroxide solution (160 ml) was placed into a three-necked flask equipped with a mechanical stirrer, and 1.164 g of hexamethylene-diamine (10 mmole) and 0.6 g of sodium laurylsulfate were added to and dissolved into the solution. To the solution thus obtained was added at a time a solution of 1.771 g (7 mmole) of 2,6-naphthalene dicarboxylic acid dichloride and 0.759 (3 mmole) of 2,7-naphthalene dicarboxylic acid dichloride in chloroform with stirring, and the whole mixture was stirred at a stirring speed of 800 rpm for 10 minutes. The polymerization solution was then poured into acetone to deposit the polymer, which was separated by filtration, washed sufficiently with hot water and dried under a reduced pressure. A 3 g portion of the polymer thus obtained was dissolved completely into 20 ml of m-cresol, and the solution was cast over a glass plate, of which the surface had been cleaned, with a glass rod. The glass plate is kept horizontal in a vacuum dryer and dried at room temperature for 12 hours, at 10° C. for 12 hours, at 150° C. for 24 hours and further at 200° C. for 24 hours to form a film. The inherent viscosity η inh, the glass transition temperature $T_g$, the melting point, the thermal degradation temperature, the tensile strength, the elongation and the tensile modulus of polymers are summarized in Tables 2 and 3.

EXAMPLES 2-3, COMPARATIVE EXAMPLES 1-7

Reactions in Examples 2-3 and Comparative Examples 1-7 were conducted in accordance with Example 1 with use of the amounts of the starting materials as described in Table 1.

TABLE 1

| Example 1 | 2,6-NDC*[1] | 70% |
|---|---|---|
| | 2,7-NDC*[2] | 30% |
| | Hexamethylenediamine | 100% |
| Example 2 | 2,6-NDC | 85% |
| | 2,7-NDC | 15% |
| | Hexamethylenediamine | 100% |
| Example 3 | 2,6-NDC | 60% |
| | 2,7-NDC | 40% |
| | Hexamethylenediamine | 100% |
| Comparative Example 1 | TPC*[3] | 50% |
| | IPC*[4] | 50% |
| | Hexamethylenediamine | 100% |
| Comparative Example 2 | IPC | 100% |
| | Hexamethylenediamine | 100% |
| Comparative Example 3 | 2,6-NDC | 100% |
| | Hexamethylenediamine | 100% |
| Comparative Example 4 | 2,6-NDC | 50% |
| | 2,7-NDC | 50% |
| | Hexamethylenediamine | 100% |
| Comparative Example 5 | 2,6-NDC | 30% |
| | 2,7-NDC | 70% |
| | Hexamethylenediamine | 100% |
| Comparative Example 6 | 2,7-NDC | 50% |
| | TPC | 50% |
| | Hexamethylenediamine | 100% |
| Comparative Example 7 | 2,6-NDC | 50% |
| | 2,7-NDC | 50% |
| | Decamethylenediamine | 100% |

*[1] 2,6-NDC = 2,6-Naphthalenedicarboxylic acid dichloride,
*[2] 2,7-NDC = 2,7-Naphthalenedicarboxylic acid dichloride,
*[3] TPC = Terephthalic acid dichloride,
*[4] IPC = Isophthalic acid dichloride.

Properties of copolyamides of Examples 1-3 and Comparative Examples 1-7 are shown in Tables 2-3.

The copolyamides of Examples 1-3 show such high glass transition temperatures that the copolyamides have good heat resistance and have some difference between the decomposition temperature and the melting point. The present copolyamides are easy to be melt-molded. The present copolyamides show such large tensile strength that they have high mechanical strength. The copolyamides of Examples 1-3 make crystal as composite.

TABLE 2

| | Aliphatic diamine | Composition of acid chlorides* (mole %) | | | | Viscosity η inh (dl/g) | Glass transition temperature (°C.) | Melting point (°C.) | Decomposition temperature (°C.) |
|---|---|---|---|---|---|---|---|---|---|
| | | 2,6-NDC | 2,7-NDC | IPC | TPC | | | | |
| Example 1 | Hexamethylene diamine | 70 | 30 | — | — | | 159 | 343 | 420 |
| Example 2 | " | 85 | 15 | — | — | | 163 | 374 | 420 |
| Example 3 | " | 60 | 40 | — | — | | 157 | 335 | 420 |
| Comparative Example 1 | " | — | — | 50 | 50 | 1.40 | 129 | 270 | 420 |
| Comparative Example 3 | " | 100 | — | — | — | 0.77 | — | 394 | 400 |
| Comparative Example 4 | " | 50 | 50 | — | — | 0.85 | 153 | 319 | 400 |
| Comparative Example 5 | " | 30 | 70 | — | — | 0.52 | 142 | 269 | 420 |
| Comparative Example 6 | " | — | 50 | — | 50 | 0.87 | 144 | 287 | 430 |
| Comparative Example 7 | Decamethylene diamine | 50 | 50 | — | — | 0.71 | 115 | 251 | 440 |

*2,6-NDC = 2,6-Naphthalenedicarboxylic acid dichloride,
2,7-NDC = 2,7-Naphthalenedicarboxylic acid dichloride,
IPC = Isophthalic acid dichloride,
TPC = Terephthalic acid dichloride.

TABLE 3

| | Aliphatic diamine | Composition of acid chlorides* (mole %) | | | | Tensile strength (kgf/mm$^2$) | Elongation (%) | Tensile modulus (kgf/mm$^2$) |
|---|---|---|---|---|---|---|---|---|
| | | 2,6-NDC | 2,7-NDC | IPC | TPC | | | |
| Example 1 | Hexamethylene-diamine | 70 | 30 | — | — | 12 | 5 | 370 |
| Example 2 | " | 85 | 15 | — | — | 14 | 10 | 370 |
| Example 3 | " | 60 | 40 | — | — | 13 | 10 | 360 |
| Comparative Example 1 | " | — | — | 50 | 50 | 9 | 14 | 320 |
| Comparative Example 2 | " | — | — | 100 | — | 10 | 11 | 340 |
| Comparative | " | 50 | 50 | — | — | 12 | 8 | 350 |

TABLE 3-continued

| Aliphatic diamine | Composition of acid chlorides* (mole %) | | | | Tensile strength (kgf/mm$^2$) | Elongation (%) | Tensile modulus (kgf/mm$^2$) |
| --- | --- | --- | --- | --- | --- | --- | --- |
| | 2,6-NDC | 2,7-NDC | IPC | TPC | | | |
| Example 4 | | | | | | | |

*2,6-NDC = 2,6-Naphthalenedicarboxylic acid dichloride,
2,7-NDC = 2,7-Naphthalenedicarboxylic acid dichloride,
IPC = Isophthalic acid dichloride,
TPC = Terephthalic acid dichloride.

The aromatic copolyamide of the present invention has a high glass transition temperature and has superior thermal stability and is capable of melt molding. Moreover, it has a high strength and a high modulus of elasticity and thus can be used for a wide range of applications such as molded articles, film, fiber, paint, adhesive or the like in the fields of electricity, automobile, machinery, medicine or general marchandise.

When the aromatic copolyamide of the present invention is intended to be used for these applications, it can be incorporated with reinforcing agents such as a glass fiber, a carbon fiber or asbestos, or additives such as a filling agent, a nucleating agent, a flame retardant, a pigment, an antioxidant, a heat stabilizer, an ultraviolet light absorber, a color protecting agent, a plasticizer, a lubricant or a mold release agent, or it can be also kneaded with the other thermoplastic resins.

I claim:

1. A copolyamide which comprises substantially 55-90 mole % of a repeating unit represented by the following formula:

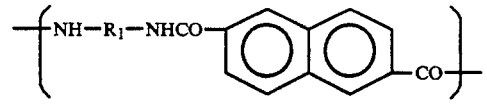

and 45-10 mole % of a repeating unit represented by the following formula:

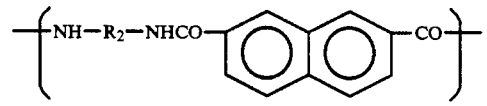

wherein $R_1$ and $R_2$ each is a group which is independently selected from a group consisting of aliphatic alkaylene groups having 4-12 carbon atoms.

2. A process for producing an aromatic copolyamide according to claim 1, comprising reacting an aqueous solution of one or more aliphatic diamines represented by the formulae:

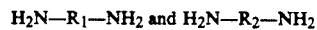

wherein $R_1$ and $R_2$ each is a group which is independently selected from a group consisting of aliphatic alkaylene groups having 4-12 carbon atoms, with a solution of (a) 2,6-naphthalene dicarboxylic acid halide and (b) 2,7-naphthalene dicarboxylic acid halide in chloroform wherein the ratio of (a):(b) is 55-90mole %: 45-10 mole %.

* * * * *